(No Model.) 6 Sheets—Sheet 1.

C. E. GOSS.
LASTING MACHINE.

No. 438,919. Patented Oct. 21, 1890.

WITNESSES: F. McArdle, C. Sedgwick

INVENTOR: C. E. Goss
BY Munn & Co.
ATTORNEYS.

(No Model.)  6 Sheets—Sheet 2.

C. E. GOSS.
LASTING MACHINE.

No. 438,919.  Patented Oct. 21, 1890.

WITNESSES:  
F. McArdle  
E. Sedgwick

INVENTOR:  
C. E. Goss  
BY Munn & Co.  
ATTORNEYS.

(No Model.)
6 Sheets—Sheet 3.
C. E. GOSS.
LASTING MACHINE.
No. 438,919. Patented Oct. 21, 1890.
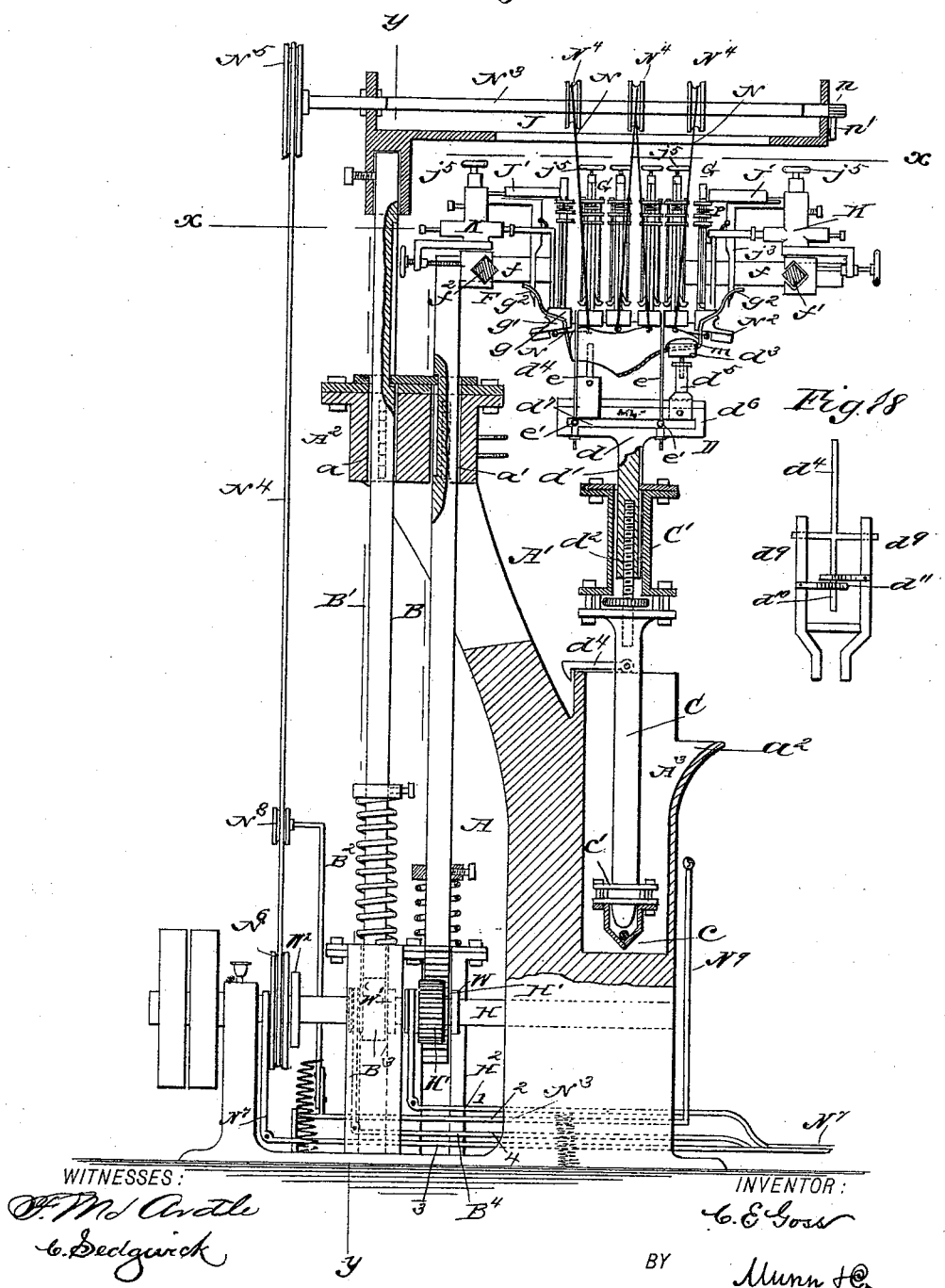
WITNESSES:
INVENTOR:
C. E. Goss
BY
Munn & Co.
ATTORNEYS.

(No Model.) 6 Sheets—Sheet 4.
C. E. GOSS.
LASTING MACHINE.
No. 438,919. Patented Oct. 21, 1890.
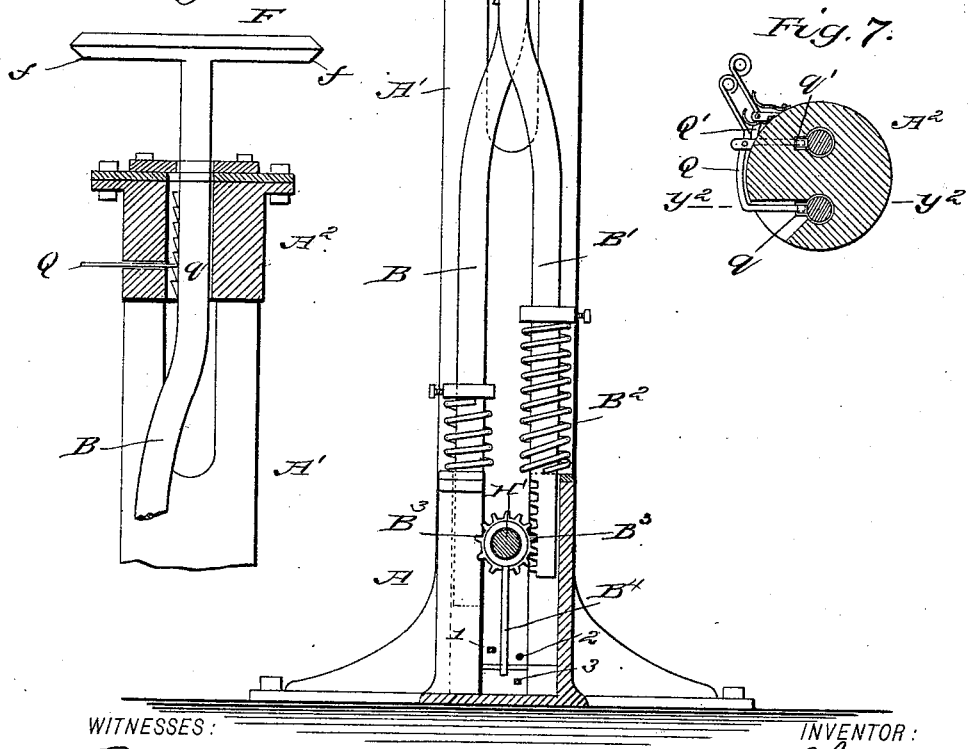
WITNESSES: INVENTOR:
C. E. Goss
BY
Munn & Co.
ATTORNEYS.

(No Model.)  6 Sheets—Sheet 5.
C. E. GOSS.
LASTING MACHINE.
No. 438,919.  Patented Oct. 21, 1890.
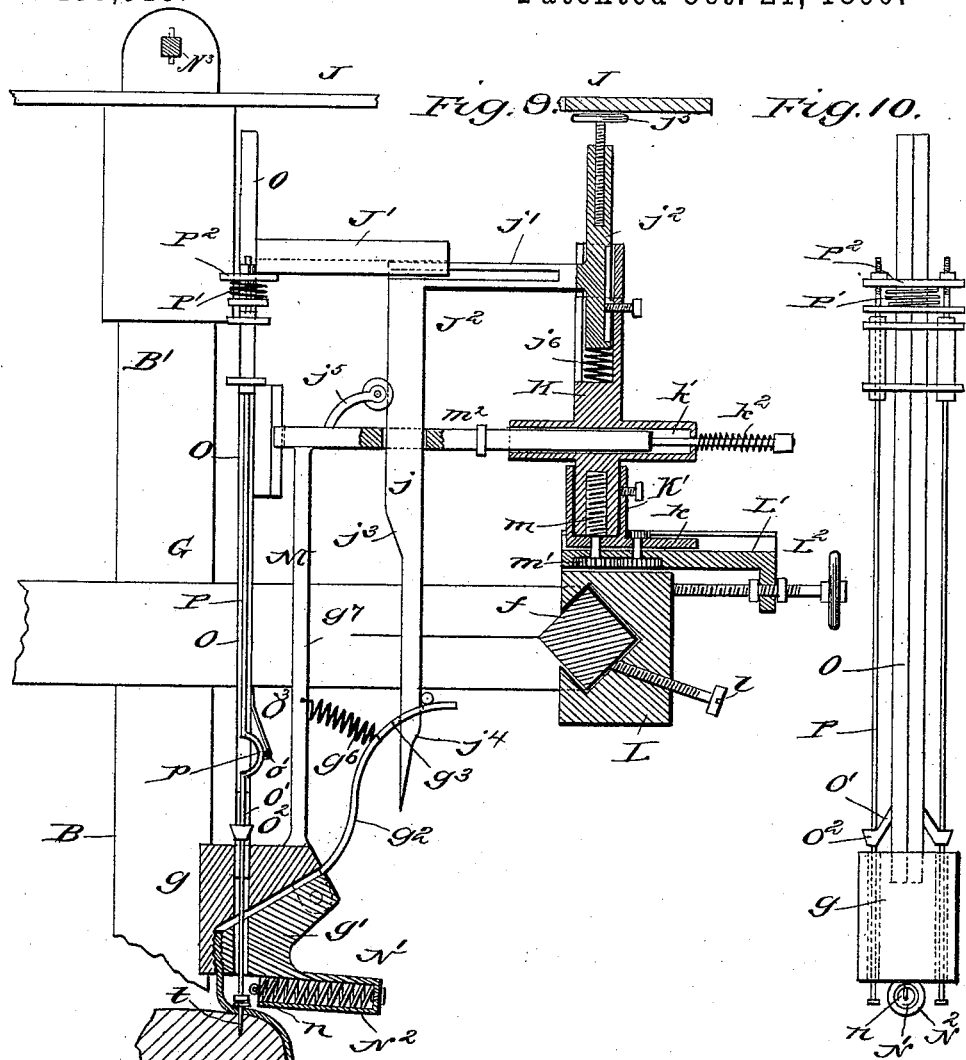
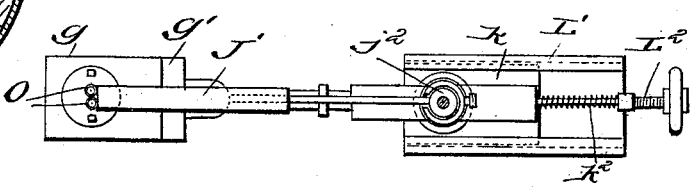
WITNESSES:  INVENTOR:
BY
ATTORNEYS.

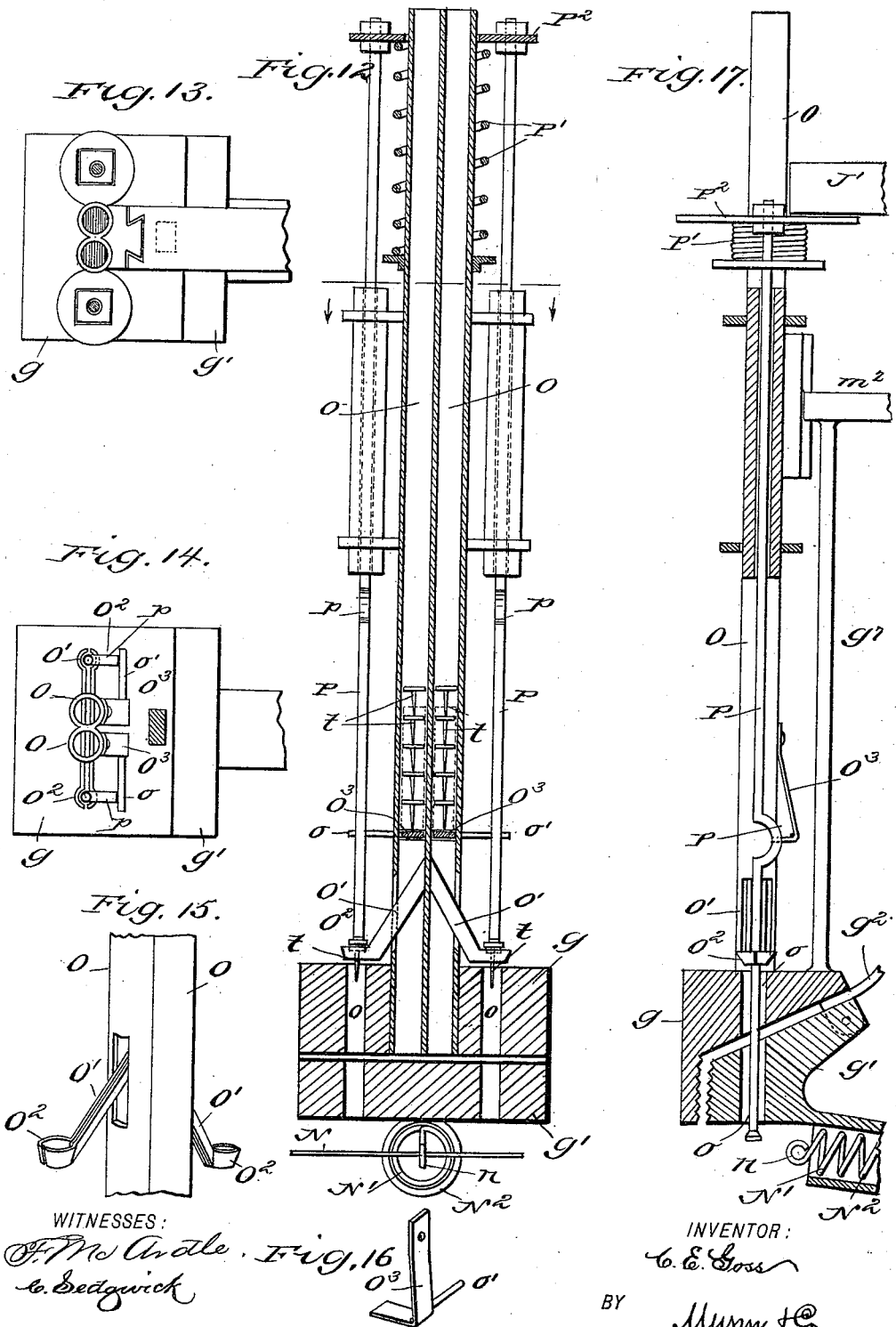

UNITED STATES PATENT OFFICE.

CHARLES E. GOSS, OF BROOKLYN, ASSIGNOR TO HIMSELF, THOMAS H. RONAYNE, OF NEW YORK, AND WILLIAM J. COTTER, OF BROOKLYN, NEW YORK.

LASTING-MACHINE.

SPECIFICATION forming part of Letters Patent No. 438,919, dated October 21, 1890.

Application filed October 24, 1889. Serial No. 328,012. (No model.)

*To all whom it may concern:*

Be it known that I, CHARLES E. GOSS, of Brooklyn, in the county of Kings and State of New York, have invented a new and improved Lasting-Machine, of which the following is a full, clear, and exact description.

Reference is to be had to the accompanying drawings, forming a part of this specification, in which similar letters of reference indicate corresponding parts in all the figures.

Figure 1:
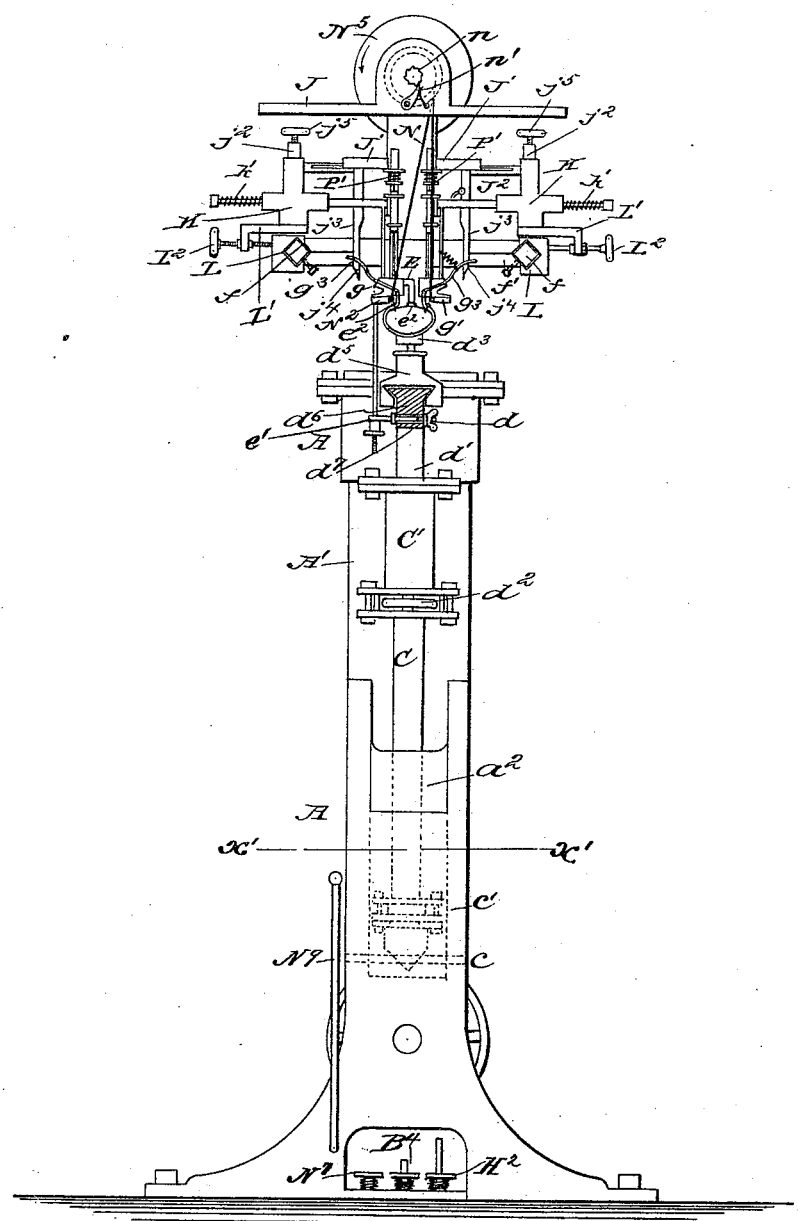
Figure 2:
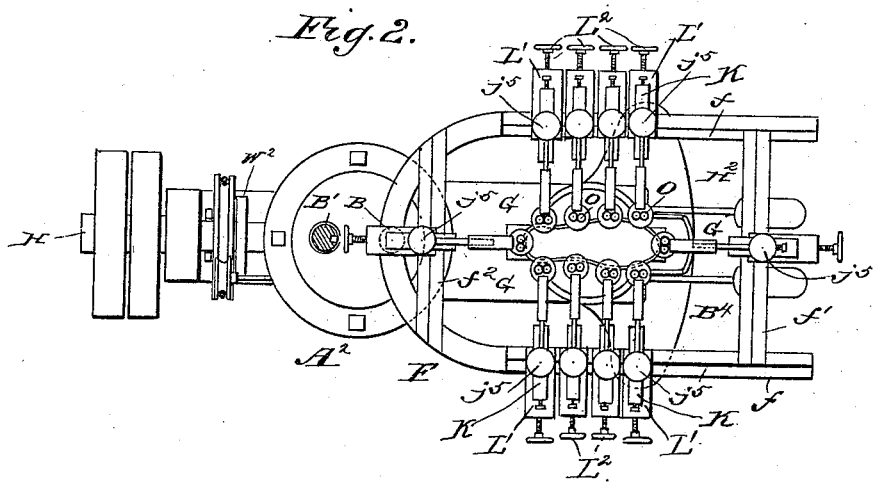
Figure 3:
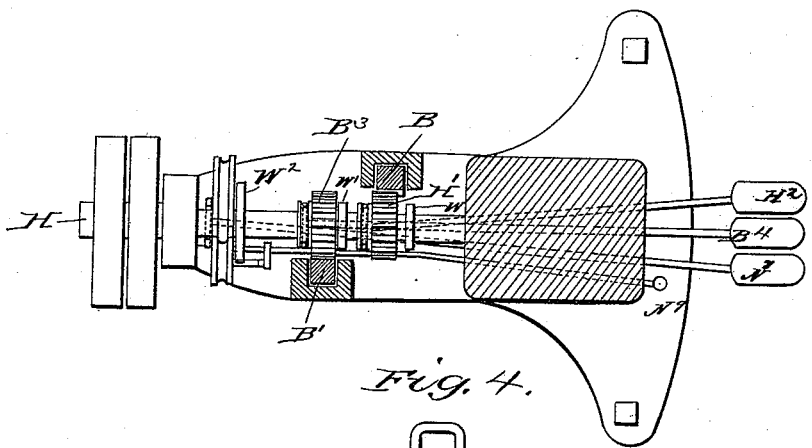
Figure 4:
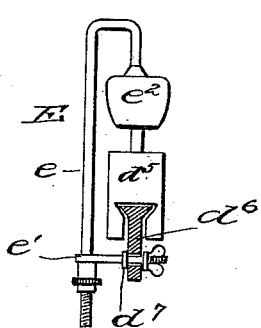

Figure 1 is a front elevation of my new and improved lasting-machine. Fig. 2 is a sectional plan view of the same on line $x\,x$ of Fig. 5. Fig. 3 is a sectional plan on line $x'\,x'$ of Fig. 1. Fig. 4 is a detailed view of the last-holder. Fig. 5 is an enlarged sectional elevation. Fig. 6 is a sectional elevation on line $y\,y$ of Fig. 5. Fig. 7 is a sectional plan view on line $y'\,y'$ of Fig. 6. Fig. 8 is a detailed view on line $y^2\,y^2$ of Fig. 7. Fig. 9 is an enlarged sectional view of one of the grippers, showing a portion of a last, the parts being in the position they assume at the time the tacks are driven. Fig. 10 is a detailed view of the tack-driving attachment. Fig. 11 is a plan view of the same. Fig. 12 is an enlarged sectional view of the same. Figs. 13, 14, 15, and 16 are detailed views of the same. Fig. 17 is an enlarged detailed view of one of the grippers and tack-drivers, and Fig. 18 is an enlarged view of the last-toggle.

The invention will first be described in connection with the drawings, and then pointed out in the claims.

A represents the main standard or frame of the machine. This is of peculiar shape, as shown in Fig. 5. It is formed with the outwardly-projecting arm A', which carries the circular head $A^2$, in vertical apertures $a\,a'$ of which are loosely held the vertical rods B B'. In a cavity $A^3$ in said standard is pivoted the post C, which is the bottom support for the last-rest D. The last-rest is composed of various parts, to be described below, and between it and the post C is a hollow intermediate section C', which receives the shank $d'$ of the stock $d$ of the rest, also the adjusting-screw $d^2$, which is threaded into the shank for adjusting the rest up or down relatively to the grippers and according to the thickness of the particular last used. The last-rest D, section C', and the post C are adapted to be tipped down or to one side on the pivot $c$ at the bottom of the said post, so that the post will rest in the lip $a^2$, thus bringing the last-rest in convenient position for the operator to place the last (after the upper is applied to it) on the toe-block $d^3$ and toggle $d^4$, both of which are attached to the stock $d$. The post C is axially pivoted in a saddle $c'$ on pivot $c$, which adapts the whole last-support to be turned, which is of convenience in putting the last and upper properly in the machine. When the post C and parts held thereby are brought to vertical position under the grippers, it is locked by hook $d^4$, as shown clearly in Fig. 5.

The toe-block $d^3$ is fitted in a clamp $d^5$, which is dovetailed on the cross-head $d^6$, (see Figs. 1 and 5,) so that the block may be adjusted along the cross-head to suit the length of the last or removed therefrom for the substitution of another. The said cross-head $d^6$ is slotted at $d^7$ to receive the links $e'$, which support the last-holders E. (Shown in Fig. 4.) These holders comprise a bent rod $e$, adjustably held in the links $e'$, and the head-piece $e^2$, which presses down on the bottom of the last and holds it firmly on the toe-block $d^3$ and toggle $d^4$, as shown in Fig. 5. The said holders E may be adjusted horizontally in the slot $d^7$ to suit any length of last.

The rod B is provided at its upper end with a U-shaped frame F, the members $f\,f$ of which are horizontally arranged and united by the cross-pieces $f'\,f^2$. These members and cross-pieces are the main supports for the grippers G G, of which there are four or more on each side of the last and one at the heel and one at the toe, as shown in Fig. 2. The jaws $g\,g'$ of the grippers are adapted to grasp the edge of the upper, as shown in Fig. 9, at which time the rod B is forced upward from contact with the pinion H' on the main shaft H to stretch the upper and draw it properly over the last. The pinion H' slides on the shaft H and is operated by a treadle $H^2$, so that this part of the machine may be put in and out of gear readily by the operator, the action of the treadle being such as to force the pinion against the friction-plate W, made fast to the shaft.

The pivoted jaws $g'$ of the grippers are closed upon the upper by rod B' and its attachments. Both the grippers and said attachments will be described in detail below. The said rod B' is normally held in elevated position by a spring $B^2$, and may be drawn down at the will of the operator by a pinion $B^3$ on the shaft H, which pinion is controlled by the treadle $B^4$ and slides on the shaft and is adapted to engage and disengage the friction-plate W'. At the top of the said shaft B' is secured the table J, beneath which table are placed the grippers. The grippers are adjustably and movably mounted on the frame F by the devices which will now be described.

On the arms $f$ of frame F are held adjustably by set-screws $l$ as many blocks L as there are pairs of grippers, and in grooved plates L' on the blocks L are adjustably held sockets K' by their feet $k$. The blocks L' are adjustable by the screw $L^2$ to shift the jaws to fit any size of last. In the sockets K' are held blocks K, which are vertically adjustable by a screw $m$, swiveled in the base of each block and engaging the base of the block. The screws $m$ are operated by the gearing $m'$. As the blocks K and their attachments are alike, a description of one will suffice for all.

In a socket $k'$ of a block K slides the horizontal member $m^2$ of a right-angled frame M, which at the lower end of its vertical arm $g^7$ carries the fixed jaw $g$ of the grippers. The horizontal member $m^2$ of this frame is formed with a reduced portion which extends through the socket and carries a cushioning-spring $k^2$, as shown in Fig. 9. In a socket in the upper end of block K is seated the post $j^2$, which carries the jaw-operator $J^2$. The post $j^2$ is seated on a cushioning-spring $j^6$, and the horizontal arm or plate $j'$ of the jaw-operator $J^2$ extends from the post through a slot in the socket-wall and carries at its outer end a vertical plate or needle $j$. The arm $j'$ carries adjustably a hammer $J'$ for a purpose hereinafter explained. The plate $j'$ is formed with a cam $j^3$, which passes through a slot in the arm $m^2$, thus carrying the grippers in toward the center of the last. The lower end of the plate $j$ is formed with a cam $j^4$, which passes through a slot $g^3$ in the arm $g^2$ of the pivoted jaw $g'$ of a gripper and acts to close the jaw $g'$ to grasp the edge of the upper, as shown in Fig. 9, which takes place before the cam $j^3$ operates to shift the gripper inward toward the center of the last. To prevent undue friction in the operation of the cam $j^3$, it is made to engage with a friction-roller carried by a bracket $j^5$ of the arm $m^2$.

The pivoted jaw of each gripper is opened by a spring $g^6$, arranged as shown in Fig. 9—that is, attached at one end to the arm $g^7$ and at the other to the arm $g^2$. The posts $j^2$ are each provided with a screw-bolt $j^5$, against which the table J strikes to force downward the post $j^2$ and needle $j'$ to operate the grippers and move them inward.

It will be understood that the rod B' will begin to descend before the rod B begins to ascend, so that when put in action the first movement is the closing of the grippers upon the edge of the upper. All the grippers are operated at the same time, each by a cam $j^4$. This done, the rod B begins to ascend, carrying the grippers upward, while the last remains at rest, thus stretching the upper. The next action is that produced by the cams $j^3$, which carry the grippers and the edge of the upper toward the center of the last, which draws the leather over the edges of the last, as indicated in Fig. 9, ready to receive the tacks $t$. Before the tacks are driven, however, a device which I term a "smoother" is brought into action. This consists of a cord or wire N, passed through the eyes $n$ of the springs N', held in sockets $N^2$, arranged one at the lower surface of each pivoted jaw of the grippers. Normally the springs N' hold the said cords or wires N away from contact with the upper; but when the grippers are carried inward by the cams $J^3$ the said cord or wire is drawn inward all around the upper, so that it gathers the upper edge of the leather and draws it all toward a common center. There are four cords or wires N—one around the heel, one around the toe, and one at each side of the instep of the last. Each cord or wire is attached to a pulley $N^4$, and both leading from the same side of the same pass through the eyes of the springs adjacent to each other. When the shaft $N^3$ is turned, all of the wires are drawn taut, so that they act together in or smooth the folds of leather between the grippers. This done, the tacks are driven to fasten the upper to the bottom of the last. The cord or wire N is thus drawn in for the purpose just stated by a shaft $N^3$ above table J and pulleys $N^4$ $N^4$ on said shaft, over which the said cord or wire is passed, as shown in Fig. 5. The shaft $N^3$ is revolved by a belt passing over pulleys $N^5$ $N^6$, and is controlled by the operator by the treadle $N^7$, which slides the pulley $N^6$ against the friction-plate $W^2$, and I use a belt-tightener $N^8$, operated by the lever $N^9$, so that any desired tension may be put on the wires or cords N. The said shaft $N^3$ is square and the pulleys $N^4$ slide freely thereon to adjust themselves to the draft of the wire or cord N, and to the end of the shaft $N^3$ is formed or attached a ratchet $n$, with which pawl $n'$ engages to hold the shaft and smoother cord or wire after the latter has been drawn up to hold the upper without further attention on the part of the operator. The tacks are held in the tack-tubes O—two for each pair of grippers. (See Fig. 12.) From each tack-tube leads a branch O', slotted at the upper surface and formed with a divided cup $O^2$ at the bottom, so that as the tacks are dropped one by one by the operation of the valve or cut-off O³ (below described) they slide along the branches O' O' and are held in the cups O² O² over the passages o o through the grippers.

P P are the hammer-rods or tack-drivers. These are normally held in elevated position by coiled springs P', Figs. 12 and 17, but are depressed to drive the tacks by the hammer J', one end of which engages with a plate P² at the top of the driver, as shown clearly in Figs. 9 and 17. The said plate P² is annular and slides on the tack-tubes, as indicated by Figs. 12 and 17. The valve or cut-off O³ is a bent spring-plate secured to the tack-tube, the horizontal portion working in a slot and provided with an arm o', against which a cam p in the drivers strike at the proper time to release a tack after the preceding one has been driven and supply it to the split cup O², ready for the next descent of the drivers.

The rods B B' may be locked at any desired position by pawls Q Q', which engage, respectively, with ratchet-teeth q q' on the rods, as shown in Figs. 7 and 8.

The toggle $d^4$ is pivoted in side plates $d^9$ $d^9$, and is formed with a tail-piece $d^{10}$, against which the springs $d^{11}$ act to throw the upper end of the toggle forward, so it will constantly exert a tension on the last, thus constantly pressing the last against the toe-block $d^3$.

Having thus described my invention, I claim as new and desire to secure by Letters Patent—

1. In a boot or shoe lasting machine, a series of grippers carried by a vertically-movable shaft and a table also attached to a vertically-movable shaft, in combination with vertical plates or needles, each formed with two opposite cams, respectively, to close the pivotal jaws of the gripper and to shift the grippers inward toward the center of the last, substantially as described.

2. In a boot or shoe lasting machine, a vertically-movable shaft provided at the top with a horizontal frame, in combination with posts attached thereto provided with vertically-movable needles or plates, each formed with two opposite cams, vertically and horizontally movable grippers, and tack tubes and drivers, all arranged substantially as described.

3. In a boot or shoe lasting machine, the posts K, attached to a vertically-movable frame, and the jaw-operator J², provided with the post $j^2$, carrying the needle or plate $j$, having cams $j^3$ $j^4$, in combination with the jaws of the grippers and the vertically-movable table J, substantially as described.

4. In a boot or shoe lasting machine, the upper jaw of the gripper formed with apertures o o and provided with tack-tubes O, having side tubes O', terminating in spring-seats for the tacks, in combination with the drivers P, valves O³, and cams on the drivers for operating the valves, substantially as described.

5. The permanent jaw of the gripper provided with vertical and horizontal bars, the latter carrying a sliding frame, in combination with the pivoted jaws of the grippers and the vertically-movable needles formed with cams $j^3$ $j^4$, the former passing through a slot in the horizontal bar of the permanent jaw of the gripper, and the latter through a slot in the plate $g^6$ of the pivoted jaw of the gripper, substantially as described.

6. The combination, with the grippers and means for moving them horizontally, of the smoother wire or cord N, springs N², attached to the bottom of the grippers and the shaft N³, and pulleys for operating the said smoother-cord, substantially as described.

7. In a boot or shoe lasting machine, a vertically-movable shaft B, having at its upper end a horizontal frame F, carrying a series of grippers, means for opening and closing them, and means for shifting them horizontally, said frame carrying also tack tubes and drivers, in combination with another vertically-movable shaft B', provided with a horizontal table J, arranged above the operating parts, substantially as described.

CHARLES E. GOSS.

Witnesses:
EDWD. M. CLARK,
EDGAR TATE.